United States Patent [19]

Kim

[11] Patent Number: 4,945,965
[45] Date of Patent: Aug. 7, 1990

[54] SAFETY TUBE ASSEMBLY FOR PNEUMATIC TIRES

[76] Inventor: Bok-Kyu Kim, Bldg. 201, #1004, Hyundai APT, 23-3 Cheongdam-dong, Kangnam-ku, Seoul, Rep. of Korea

[21] Appl. No.: 262,957

[22] Filed: Oct. 26, 1988

[30] Foreign Application Priority Data

Oct. 29, 1987 [KR] Rep. of Korea ............... 18432/1987

[51] Int. Cl.⁵ .................................................. B60C 5/00
[52] U.S. Cl. .................................. 152/511; 152/331.1
[58] Field of Search ............... 152/333.1, 334.1, 336.1, 152/331.1, 339.1, 512, 340.1, 516, 518, 511

[56] References Cited

U.S. PATENT DOCUMENTS

| 600,828 | 3/1898 | Carter | 152/331.1 X |
| 620,507 | 2/1899 | Sewell | 152/334.1 |
| 642,336 | 1/1900 | Junod | 152/331.1 |
| 924,812 | 6/1909 | McArthur | 152/331.1 |
| 2,070,066 | 2/1937 | Picardi | 152/331.1 |
| 2,213,028 | 8/1940 | Kraft | 152/339.1 X |
| 2,690,779 | 10/1954 | Rust | 152/331.1 |
| 4,279,284 | 7/1981 | Spadone | 152/511 |

FOREIGN PATENT DOCUMENTS

| 0508971 | 2/1952 | Belgium | 152/331.1 |
| 0605413 | 5/1926 | France | 152/331.1 |
| 0432822 | 1/1949 | Italy | 152/331.1 |
| 0010665 | of 1896 | United Kingdom | 152/331.1 |
| 0024795 | of 1910 | United Kingdom | 152/331.1 |

Primary Examiner—Raymond Hoch
Attorney, Agent, or Firm—Lieberman, Rudolph & Nowak

[57] ABSTRACT

A safety tube assembly for a pneumatic tire, the assembly including a plurality of balloons being contiguously disposed on the underside of a tread portion of the tire and an annular primary tube accommodated within the circumference of the balloons whereby each of the small balloons becomes an independent chamber interposed between the primary tube and the underside of the tread portion. Another feature of the invention is the provision of a puncture-resistant band surrounding the small balloons for dual protection against puncture of the pneumatic tire.

1 Claim, 2 Drawing Sheets

SAFETY TUBE ASSEMBLY FOR PNEUMATIC TIRES

BACKGROUND OF THE INVENTION

The present invention relates generally to so-called safety tires, and more specifically to a safety tube assembly for pneumtic tires having run-flat capabilities.

Already, there are known tubeless pneumatic tires which are characterized as being puncture-proof and which when punctured can run at certain speeds for certain periods of time.

Such tires are capable of running either in an entirely flat condition or in a substantially deflated state when they are locally punctured, perforated, or pierced.

However, these tires are uncomfortable and wear out at an excessive rate, when they are used in a flat or substantially flat condition.

Moreover, such tires have a drawback in that they are extremely heavy and expensive.

A further drawback exists in that the above-mentioned tires require special construction and configuration and must be mounted on a vehicular wheel rim of corresponding construction. As a result, the combination of such a tire and its vehicular wheel rim is extremely costly and complicated.

Other tubless pneumatic tires employ the addition of extra reinforcing layers and spacer projections integral with or attached to the internal surface of the carcass or external surface of the tube to ensure that these two members remain spaced from one another when the air chamber between them deflates.

However, such tires have two basic difficulties in that firstly, the provision, usually in rubber, of spacer projections or layers involves the addition of extra mass with consequent high speed performance penalty, and secondly, the projections or layers involve considerable modification and complication of the carcass and tube construction with consequent price increase.

Accordingly, the known pneumatic tubless tires may become punctured from sharp-tipped objects lying on the roadway, whereby the sudden loss of air causes instability of the vehicle. If the vehicle is running at high speed, the instability of the vehicle subjects the vehicle occupants to great danger.

Heretofore, the construction of the pneumatic tires have been reinforced to avoid the danger of a sudden blowout. However, it has been noted that the cause of many fatal accidents is due nevertheless to the failure of such reinforced tires themselves.

SUMMARY OF THE INVENTION

In consideration of such drawbacks which have been inevitable in reinforced pneumatic tires, it would be desirable to attain an efficient solution to this problem.

The present invention is essentially directed to the provision of a useful solution to such difficulty in practice as referred to above and experienced in the conventional pneumatic tires.

Therefore, it is a primary objective of the present invention to provide an improved safety tube assembly for pneumatic tires so constructed that accidents are avoided when the tire is punctured.

Another objective of the present invention is to provide a safety tube assembly for pneumatic tires having run-flat capabilities that can be used effectively with the conventional pneumatic tires and conventional vehicular wheel rims.

Yet another objective of the present invention is to provide a simple and inexpensive tube assembly for pneumatic tires.

To accomplish the above objectives, a safety tube assembly for pneumatic tires, in accordance with aspects of the present invention, is characterized in that plural rows of small balloons inflated at a predetermined pressure are contiguously disposed on the underside of the tread portion, an annular primary tube is accomodated in the tire, and each one of the small balloons serves as an independent chamber in contact with one another by means of the radial expansion of the primary tube.

In a preferred embodiment, plural rows of the small balloons are contiguously attached to a flexible and puncture-resistant band by adhesive, and then the band is provided on the underside of the tread portion.

Accordingly, each one of the small balloons becomes an independent chamber interposed between the outer peripheral surface of the primary tube and the underside of the tread portion.

In use, the pneumatic tire equipped with the safety tube assembly, according to the invention, is mounted on the vehicular wheel rim in the normal manner. One of the chambers which are contiguously arranged on the underside of the tread portion is punctured when the tread portion is pierced from a sharp foreign object lying on the roadway.

As the punctured air chamber deflates, the other adjacent air chambers expand and fill the space cleared by the deflated and punctured chamber. Consequently, the annular primary tube is not effected by the puncture, whereby the vehicular wheel can continue to run on a pneumatic tire inflated practically at standard pressure.

The given size of the small balloon may be 5 cm in diameter, but the diameter can be adjusted depending on the vehicular size.

The punctured small chamber can be readily replaced by a new one at a cost that is less then that of an entire inner tube. It is even possible to replace the spare wheel of a passenger car or of other type of motor vehicles by a supply of spare small balloons carried along in the car trunk.

The present invention, by creating only a safety tube assembly consisting of a primary tube and a plurality of small balloons that are very simple to manufacture, makes it possible to provide a pneumatic safety tire that is substantially less costly than the pneumatic safety tires presently manufactured and, thereby, more profitable not only in the sale of new pneumatic tires, but also in the sale of spare small balloons.

The present invention is extremely reliable and efficient to operate, therefore, of great dependability.

Moreover, the pneumatic tire in accordance with the invention is far lighter in weight than the pneumatic safety tire presently manufactured which has a favorable effect on its handling manner, its road-engaging ability, travelling comfort, and its effect on the vehicle.

Additional objectives, features and advantages of the invention will now become more apparent to those knowledgeable in the field upon consideration of the following detailed description of preferred embodiments exemplifying the best mode of carrying out the invention as presently perceived.

DETAILED DESCRIPTION OF PREFERRED EMBODIMENTS

Figure 1:
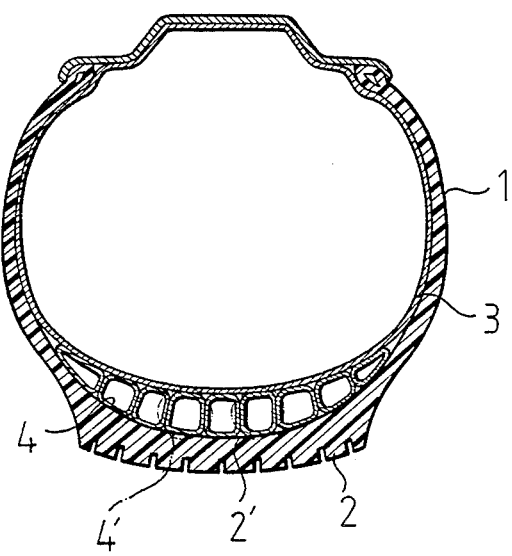
FIG. 1 is a fragmentary cross-sectional view along an axial plane section showing a peripheral portion of a vehicle wheel rim outfitted with a pneumatic tire in accordance with one embodiment of the invention and illustrated in its undamaged inflated condition.
Figure 2:
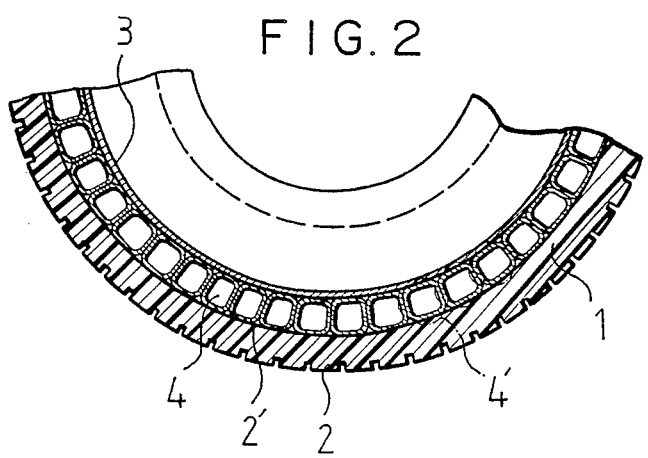
FIG. 2 is a fragmentary view of a cross-section along a median circumferential sectional plane.

In accordance with the embodiment illustrated in FIG. 1 and 2, the pneumatic tire according to the invention referred to generally by the reference character 1, is mounted on a wheel rim which is assumed to be supported by a wheel hub (not shown).

A plurality of small balloons 4' are preferably similar or identical but independent of one another and arranged contiguously and juxtapositioned in series in the normally inflated state along underside 2' of tread portion 2 of a tire casing 1. The small balloons 4' are inflated to a predetermined pressure and the given size of the small balloon 4' may be approximately 5 cm in diameter, of which size is capable of association with several different sizes of pneumatic tires.

Each one of the small balloons 4 is made of a pliable or flexible and elastically expandable and contractable material.

An annular primary tube 3 is accomodated in the tire casing 1 so that the outer circumferential surface of the primary tube 3 abuts against the upper surface of each balloon 4' by means of the radial expansion of the primary tube 3. Accordingly, a plurality of the small balloons 4' circumferentially and contiguously surround the primary tube 3 and are placed between the latter and the underside 2' of the tread portion 2.

In a normally inflated state of the primary tube 3, each one of the small balloons 4' becomes substantially a small chamber 4 of a curvilinear trapezoid shape.

In operation, the air is injected into each balloon 4' at a predetermined pressure and then the small balloons 4' are arranged contiguously and juxtapositioned in a series on the underside 2' of the tread portion 2. The primary tube 3 will be accomodated in the tire casing 1.

In order to inflate the pneumatic tire, all that is required is to introduce compressed air into the primary tube 3 through the ordinary inflating valve (not shown) in normal manner.

Figure 3:
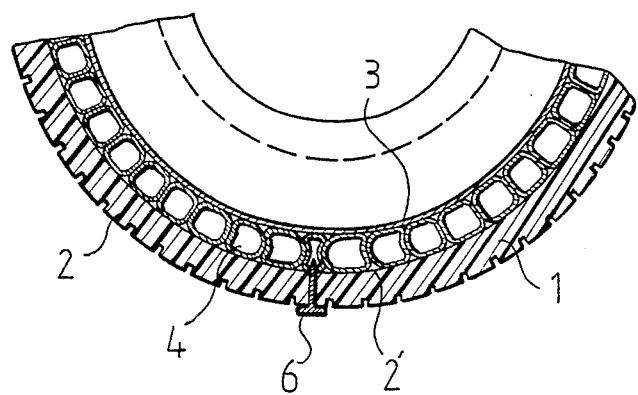
FIG. 3 is a view similar to that of FIG. 1, showing a small balloon of the safety tube assembly in a punctured state caused by a nail that has pierced the tread portion.

In the event of a puncture of a small chamber 4, as a result of the perforation of its radially external wall by a nail or a similar sharp-tipped element 6 that has pierced the tread portion 2 (see FIG. 3), the small chamber 4 that has been affected deflates.

The four closest none-punctured chambers 4 that are still intact and that are situated on each end of the punctured small chamber expand in order to take up the space that has become vacant. Accordingly, the wheel can continue to travel on a pneumatic tire that remains substantially normally inflated.

If all of the small chambers 4 are punctured, the wheel can still continue running on the primary inner tube 3 that remains inflated.

Figure 4:
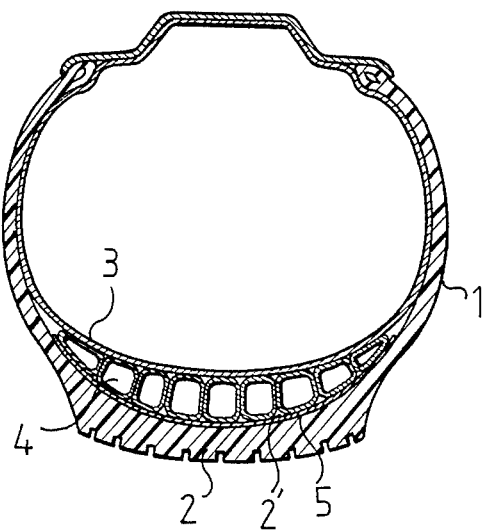
FIG. 4 is a view similar to that of FIG. 1, showing a flexible and puncture-resistant band interposed between plural rows of the small chambers and the underside of the tread portion.

Another embodiment of the invention is shown in FIG. 4. In this embodiment, plural rows of the small balloons 4' are contiguously attached on a flexible and puncture-resistant band 5 by the adhesive, and then the band assembly is completely and circumferentially provided on the underside 2' of the tread portion 2.

This embodiment allows the small balloons 4' to be conveniently installed on the underside 2' of the tread portion 2 by means of the band 5.

Thus, dual protection against a puncture can be obtained by the puncture-resistant band 5 and the small balloons. The toughness and size of the band 5 could be varied according to the protection necessary.

On the other hand, when a punctured or defective small balloon is replaced, it is necessary to first deflate the pneumatic tire by opening the air inlet valve, thereby bringing about the deflation of the primary inner tube 3.

One can then dismantle the pneumatic tire from the wheel rim and remove the primary inner tube 3. The defective small balloon can then be removed by inspection, and one can proceed with replacing the defective small balloon with a new small balloon.

From the foregoing, it can be seen that a simple yet reliable safety tube assembly has been devised whereby vehicle accidents may be avoided or at least minimized with the provision of the small balloons and/or the puncture-resistant band.

In conclusion, it is felt that the invention constitutes one of the few safety type concepts which is really practical for general use by private and commercial vehicles at negligible cost.

It is to be understood that the appended claims are intended to cover all of such generic and specific features particular to the invention as disclosed herein and all statements relating to the scope of the invention, which as a matter of language might be said to fall thereunder.

What is claimed is:

1. A safety tube assembly for use within a pneumatic tire, said assembly comprising a plurality of small balloons inflated at a predetermined pressure, said small balloons being contiguously disposed and juxtapositioned in a position corresponding to the underside of the tread portion of a pneumatic tire, and an annular primary tube accommodated within the circumference of said small balloons, whereby said small balloons serve as independent small chambers in contact with one another between the position corresponding to the underside of said tread portion and the outer circumferential surface of said primary tube by means of inflation of said primary tube, each of said small balloons being made of a pliable, flexible, elastically expandable and contractible material, said safety tube assembly including a band provided completely and circumferentially in a position corresponding to the underside of said tread portion and which when installed within a pneumatic tire directly contacts said tread portion, wherein said band is made of a flexible and puncture resistant material.

* * * * *